United States Patent [19]

Lanciault

[11] 3,823,703

[45] July 16, 1974

[54] SELF-STORING SOLAR HEATER

[76] Inventor: Joseph A. Lanciault, 902 Highland Ave., Fitchburg, Mass. 01420

[22] Filed: Oct. 21, 1971

[21] Appl. No.: 191,375

[52] U.S. Cl. ............................................. 126/271
[51] Int. Cl. ............................................... F24j 3/02
[58] Field of Search ............................ 126/270, 271

[56] References Cited
UNITED STATES PATENTS
3,595,216   7/1971   Lanciault ............................ 126/271
3,513,828   5/1970   Masters ............................... 126/271
3,039,453   6/1962   Andrassy ............................. 126/271

Primary Examiner—William F. O'Dea
Assistant Examiner—Paul Devinsky
Attorney, Agent, or Firm—Alexander B. Blair

[57] ABSTRACT

A self-storing solar heater is disclosed installed on a house trailer with the heater being extendable over a portion of the roof of the trailer to receive the rays of the sun during the day and is stored in a heated compartment on cold days and nights to prevent the water in the solar heater from freezing. A thereomstatically controlled motor driven reel retracts the solar heater into the heated storage compartment and a pulley system actuated by the same motor extends the solar heater when heating rays are available from the sun.

6 Claims, 5 Drawing Figures

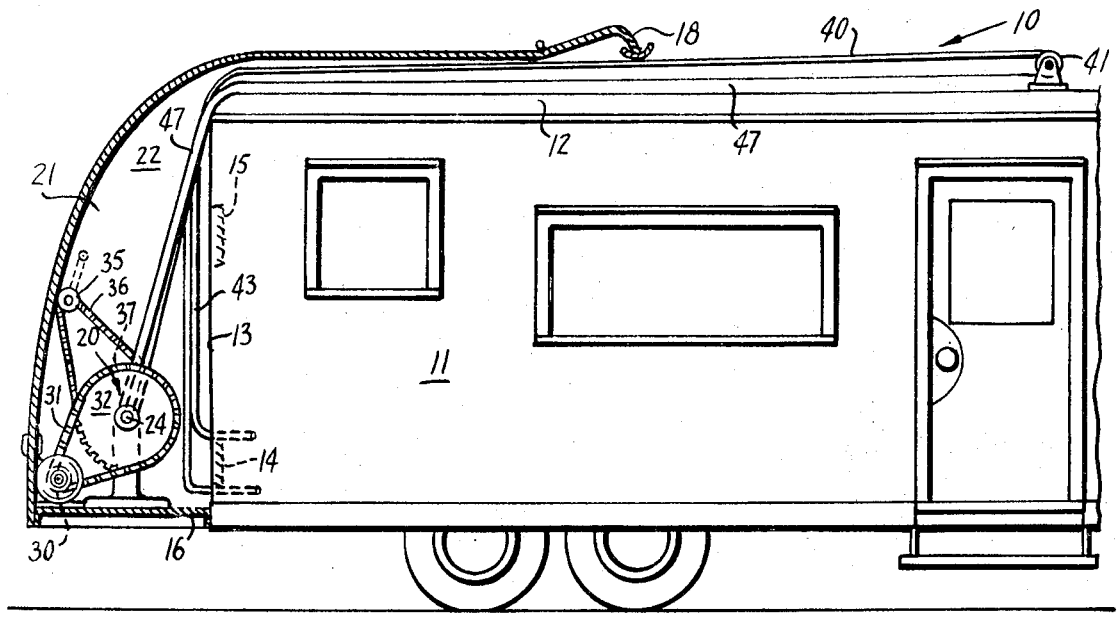

INVENTOR.
JOSEPH A. LANCIAULT
BY
Alexander B. Blair
ATTORNEY.

3,823,703

SELF-STORING SOLAR HEATER

BACKGROUND OF THE INVENTION

1. Field of the Invention

The present invention relates to solar water heaters.

2. Description of the Prior Art

In prior art solar water heaters the water containing coils were permanently affixed in extended position to receive the rays of the sun. When the ambient temperature declined to below freezing and the sun was not available for heating the coils water remaining in the coils would freeze thus rupturing the pipes in the system. In prior art devices in order to prevent the water from freezing the coil was drained from a low spot so that no water remained to be frozen.

SUMMARY OF THE INVENTION

A flexible plastic solar water coil is secured to a plastic sheet with the plastic sheet being extendable and retractable by a motor driven reel and pulley system thermostatically controlled to extend the solar heating system when sun rays are available for heating water and retract the heater into a heated compartment when the temperature drops sufficiently to freeze the water in the heater.

The primary object of the invention is to provide a solar water heater which thermostatically protects the heater from freezing when exposed to below freezing temperatures.

Other objects and advantages will become apparent in the following specification when considered in the light of the attached drawings.

BRIEF DESCRIPTION OF THE DRAWINGS

FIG. 1 is a side elevation of the invention shown partially broken away and in section for convenience of illustration;

FIG. 2 is a top plan view of the invention shown partially broken away and in section for convenience of illustration;

FIG. 3 is an enlarged fragmentary transverse sectional view taken along the line 3—3 of FIG. 2 looking in the direction of the arrows;

DESCRIPTION OF A PREFERRED EMBODIMENT

Figure 4:
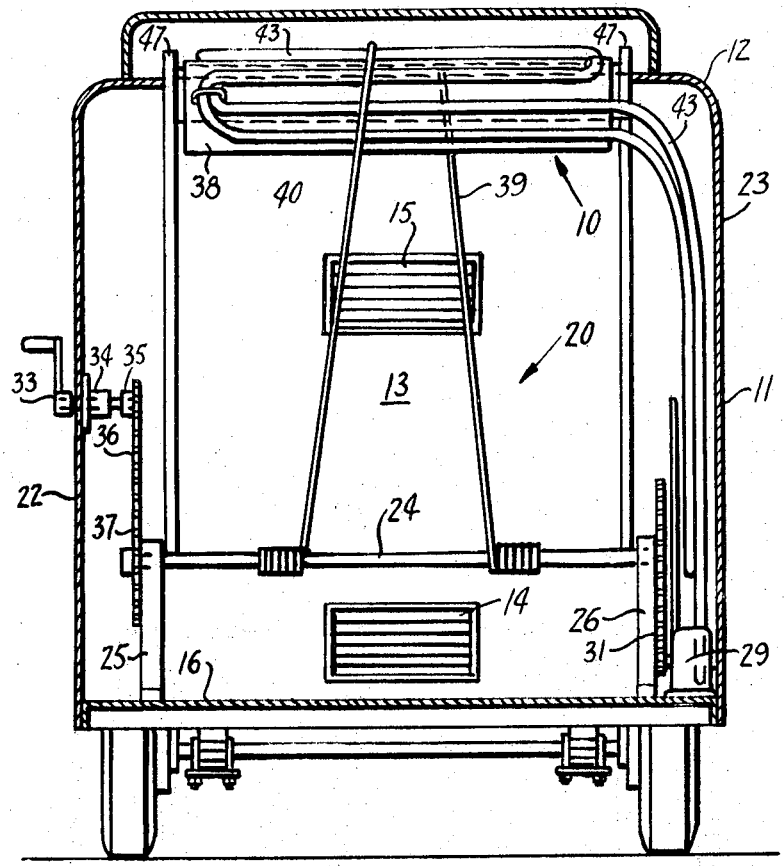
FIG. 4 is a vertical sectional view taken along the line 4—4 of FIG. 2 looking in the direction of the arrows.

Referring now to the drawings in detail wherein like reference characters indicate like parts throughout the several figures the reference numeral 10 indicates generally a solar water heater constructed in accordance with the invention.

The solar heater 10 is attached to a house trailer 11 having a roof 12 and a rear wall 13. Heat circulating louvered openings 14, 15 extend through the rear wall 13 of the trailer 11 so as to communicate the heated air in the interior of the trailer 11 with the space to the rear thereof. A generally rectangular floor 16 is secured to the rear end of the trailer 11 and extends outwardly therefrom. An arcuate compartment wall 17 extends upwardly from the rear edge of the bottom wall 16 and curves inwardly therefrom to lie parallel to the roof 12 of the trailer 11. A cover 18 extends transversely across the forward edge of the arcuate wall 17 and is spring hinged thereto to provide a trap door.

A reel generally indicated at 20 is mounted in the compartment 21 formed by the arcuate wall 17 and side wall extensions 22, 23. The reel 20 has a shaft 24 journaled in a pair of posts 25, 26 mounted on the floor 16. An electric motor 29 having a sprocket 30 and a chain 31 trained thereover is also trained over a relatively large sprocket 32 fixed to one end of the shaft 24.

A hand crank 33 is journaled in a bushing 34 mounted on the side 22 of the compartment 21 and a sprocket 35 is mounted on its inner end. A chain 36 is trained over the sprocket 35 and over a sprocket 37 rigidly secured to the end of the shaft 24 opposite the electric motor 29.

A flexible plastic generally rectangular sheet 38 has a bar B secured to its forward end attached to the reel 20 by means of cables 39, 40. The cable 40 is trained over a pulley 41 rigidly secured to the top 12 of the trailer 11. The cable 40 is then wound on the shaft 24 of the reel 20. The cable 39 is also secured to the shaft 24 in a direction of winding opposite to that of the cable 40 so that as the reel 20 is rotated the cables 39 will be reeled in while the cable 40 is paid out and vice versa.

A flexible black plastic pipe 43 is secured in a serpentine fashion to the sheet 38 by a plurality of cleats 44. Reinforcing bands 45 formed of flexible material are secured to the underside of the plastic sheet 38 to assist in maintaining its form and reinforcing it against tear as well as supporting outwardly extending pins P. The flexible plastic pipe 43 has one end extending into the trailer 11 and connected to a cold water supply with the other end extending into the trailer and connected to a hot water tank. The heat of the sun on the pipe 43 causes a circulation of the water in the pipe 43 so that heated water gradually fills the hot water tank.

The roof 12 of the trailer 11 has a support plate 46 secured thereto and carrying a pair of spaced parallel guide tracks 47 thereon and extending downwardly to the reel 20. The guide tracks 47 receive the pins P on the sheet 38 to prevent the sheet 38 from leaving its desired location.

Figure 5:
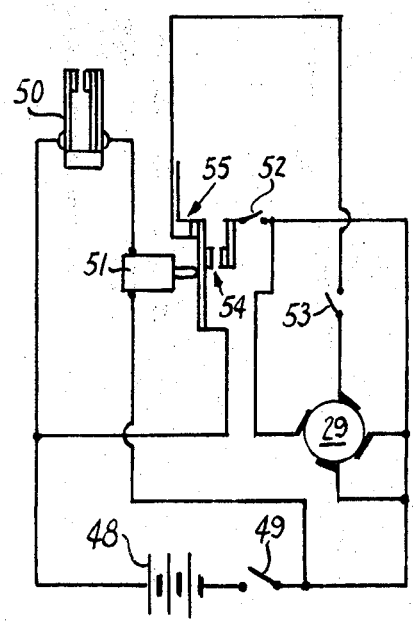
FIG. 5 is a diagrammatic view of the electric circuitry of the invention.

The electric circuit is illustrated in FIG. 5 and includes a battery 48, hand control switch 49, reversible electric motor 29, thermostatic switch 50, double pole relay switch 51, extending limit switch 52 and retracting limit switch 53.

As the sun warms the top of the trailer 11 the thermostat switch 50 closes energizing the relay 51 closing contacts generally indicated at 54 and opening contacts generally indicated at 55. Current flowing through the contacts 54 flows through the normally closed limit switch 52 and energizes the motor 29 to cause the cable 40 to be tightened to pull the sheet 38 out-wardly across the top of the trailer 11. The bar B engages and opens the door 18 at the top front of the compartment 21. When the sheet 38 reaches its fullest extent the limit switch 52 is conventionally opened deenergizing the motor 29.

When the temperature falls a predetermined amount of thermostat switch opens deenergizing the relay switch 51 opening the contacts 54 and closing the contacts 55. With the contacts 55 closed current flows through the normally closed limit switch 53 to the motor 29 to cause it to operate in a reverse direction to that previously described to thus cause the shaft 24 to wind in the cable 39 retracting the sheet 38. When the sheet 38 is completely retracted, limit switch 53 is conventionally opened and the cover 18 is spring closed so that the compartment 21 is then heated by air flowing through the vents 14 and 15 to prevent the water from freezing in the flexible conduit 43.

The hand crank 33 may be utilized to wind the reel 20 in either direction in the event that electric energy is not available for the electric motor 29.

Having thus described the preferred embodiment of the invention it should be understood that numerous structural modifications and adaptations may be resorted to without departing from the spirit of the invention.

I claim:

1. A solar water heating system in combination with a trailer of the type having a roof and a rear wall, a compartment mounted on the rear and top wall of said trailer, a reel in said compartment, a cable wound on said reel, a flexible sheet, means including said cable in said compartment and on said trailer for extending and retracting said sheet from said compartment, a flexible solar water heater pipe secured to said sheet, means connecting said solar water heater pipe to a water heating system, and means for closing said compartment with said solar water heater pipe and said flexible sheet retracted therein.

2. A device as claimed in claim 1 wherein the means for extending and retracting is thermostatically controlled.

3. A device as claimed in claim 2 wherein the means for extending and retracting includes a reversible electric motor.

4. A device as claimed in claim 1 wherein a pair of guide tracks are secured to the roof of said trailer and extend downwardly in said compartment to guide the opposite side edges of said sheet.

5. A device as claimed in claim 1 including means for heating said compartment to prevent the water in the solar water heater pipe from freezing.

6. A device as claimed in claim 1 wherein the means for extending and retracting includes a cable wound on said shaft and extending over a pulley and connected to the outer end of said sheet for drawing said sheet from said compartment onto the roof of said trailer.

* * * * *